US005852179A

United States Patent [19]
Dado

[11] Patent Number: 5,852,179
[45] Date of Patent: Dec. 22, 1998

[54] PREPARATION OF DISPERSE AZO DYESTUFFS IN THE PRESENCE OF ALKOXYLATED ACETYLENIC DIOLS

[75] Inventor: Gregory Paul Dado, Emmaus, Pa.

[73] Assignee: Air Products and Chemicals, Inc., Allentown, Pa.

[21] Appl. No.: 85,452

[22] Filed: May 27, 1998

[51] Int. Cl.$^6$ .......................... C09B 41/00; C09B 67/10; C09B 67/48
[52] U.S. Cl. .......................... 534/581; 534/575; 534/859; 534/887
[58] Field of Search .................................. 534/575, 581, 534/887

[56] References Cited

U.S. PATENT DOCUMENTS

| | | | |
|---|---|---|---|
| 3,268,593 | 8/1966 | Carpenter et al. | 568/616 |
| 3,956,270 | 5/1976 | von Rambach et al. | 534/575 |
| 4,074,965 | 2/1978 | Kruse et al. | 8/622 |
| 4,785,082 | 11/1988 | Weide et al. | 534/887 |
| 4,795,807 | 1/1989 | Bühler et al. | 534/581 |
| 4,828,622 | 5/1989 | Weide et al. | 106/412 |
| 4,960,435 | 10/1990 | Tunoda et al. | 534/575 X |
| 5,395,434 | 3/1995 | Tochihara et al. | 106/31.43 |
| 5,532,344 | 7/1996 | Himeno et al. | 534/581 |
| 5,650,543 | 7/1997 | Medina | 568/616 |
| 5,764,261 | 6/1998 | Koike et al. | 347/100 |

OTHER PUBLICATIONS

Shinmura et al., Chemical Abstracts, 83:12070 (1975), Abstract of Japanese patent 49–116,389.
Vance et al., Chemical Abstracts, 90:105628 (1979), Abstract of Czech, patent 174,978.

*Primary Examiner*—Fiona T. Powers
*Attorney, Agent, or Firm*—Michael Leach

[57] ABSTRACT

The use of alkoxylated acetylenic diol surfactants in the aqueous synthesis of disperse azo dyes provides a simple process for improving filtration properties of dyestuff. The surfactants may be added prior to the coupling step of the synthesis or prior to heat treatment of the dye slurry. Advantages that are realized by incorporation of the surfactants into the synthesis include decreased filtration time, increased solid content in filter cake, improved washing properties of filter cake, and increased dye yield. In addition, for azo dyes that are synthesized as non-heat-stable crystal modifications, the presence of alkoxylated acetylenic diol surfactants in the dye slurry is effective in promoting the conversion of the dye to the desired thermally stable crystal modification.

20 Claims, No Drawings

PREPARATION OF DISPERSE AZO DYESTUFFS IN THE PRESENCE OF ALKOXYLATED ACETYLENIC DIOLS

FIELD OF THE INVENTION

The present invention relates to the use of alkoxylated acetylenic diols in the aqueous coupling reaction and/or heat treatment stages in the process for making disperse azo dyestuffs.

BACKGROUND OF THE INVENTION

Disperse azo dyestuffs are a class of dyes in which a sparingly water-soluble azo compound is produced by the reaction of a diazonium salt of an aromatic or heteroaromatic amine with a coupling component, typically in water. The resulting product is obtained as an aqueous slurry of precipitated dye that is sometimes subjected to a heat treatment step to convert the material into a thermally stable form and/or to improve the ease of performing subsequent steps such as filtration. The slurry is filtered and washed in preparation for subsequent processing. During the coupling reaction, it is desirable to limit the amount of reaction foaming and product tarring, and to maximize product yield and purity. For dyes that require a heat treatment step, minimization of time and temperature requirements to achieve the required properties is desirable so as to minimize energy costs.

Reaction product isolation is an important step in disperse dye processing. Short filtration time and ease of washing of product are desired so as to afford a high space/time yield and to minimize the generation of waste effluent. Filter cakes are washed in the manufacturing process to remove by-products, acids or bases, and salts. These species are removed because they can interfere in subsequent processing steps.

In addition, it is desirable to obtain as high of a level of solids in the filter cake as possible. If the solids level of the filter cake is too low for the dye paste to be used directly in subsequent processing, then a drying step must be added to the manufacturing process. If the filter cake solids level is sufficiently high, then the expensive drying step can be avoided.

Heat treatment of disperse azo dye slurries upon completion of the coupling reaction, sometimes necessary to convert the dye to its required crystal form, often results in improved filtration properties when compared to dyestuff that has not been heat treated.

Incorporation of certain additives during the coupling reaction is known to enhance the filtration properties of disperse azo dyestuff without heat treatment, the additive being dependent on the dyestuff and on the process employed. In addition, the use of certain additives has been reported in the context of heat treatment for the purpose of effecting change in crystal form of disperse azo dyes.

U.S. Pat. No. 5,532,344 discloses the use of polyoxyethylene higher fatty acid ester nonionic surfactants in the preparation of monoazo dye by coupling a p-nitroaniline derivative with an N,N-disubstituted aniline derivative.

U.S. Pat. Nos. 4,785,082 and 4,828,622 disclose the use of surfactants with cloud points between 5°–90° C., including EO/PO block copolymers and oxyalkylates of aliphatic, aromatic, cycloaliphatic, or heterocyclic hydroxy or amino compounds, in the preparation of concentrated press cakes of disperse dyes and water-insoluble or sparingly water-soluble solids.

U.S. Pat. No. 4,795,807 discloses the use of esters of lower aliphatic carboxylic acids in the preparation of disperse azo dyes.

Numerous patents describe the use of additives during heat treatment of aqueous dye slurries. For example, U.S. Pat. No. 3,956,270 discloses the preparation of a stable β-modified azo dye via heat treatment of α-modification in aqueous suspension with or without adding an organic solvent such as alcohols, ethers, glycols, or glycol ethers.

U.S. Pat. No. 4,074,965 discloses the preparation of a stable β-modification of an azo dye by heating the α-modification of the dye as an aqueous suspension that can contain water-soluble organic solvents or anionic, cationic, or nonionic surfactants.

The use of the acetylenic diol 2,4,7,9-tetramethyl-5-decyne-4,7-diol, marketed under the trademark Surfynol® 104 by Air Products and Chemicals, Inc., in pure form or diluted with solvent carriers such as ethylene glycol or propylene glycol, for the improvement of the filtration properties of organic precipitates is known, and has been disclosed in product literature. In addition, this acetylenic diol has been used in the preparation of disperse azo dyestuffs.

SUMMARY OF THE INVENTION

The present invention pertains to a process for the preparation of disperse azo dyestuffs by reacting a diazonium salt of an aromatic or heteroaromatic amine and a coupling component in an aqueous phase to afford an aqueous slurry of the azo dyestuff, with optional heat treatment of the aqueous slurry of the azo dyestuff. The inventive process incorporates an alkoxylated acetylenic diol surfactant into the dye synthesis process, especially incorporating the surfactant in the coupling reaction and/or the heat treatment steps. Suitable alkoxylated acetylenic diol surfactants include those of the general formula:

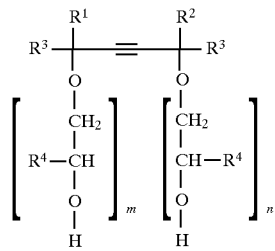

where $R^1$ and $R^2$, which may be the same or different, are C1–C8 alkyl, $R^3$ is hydrogen or methyl, $R^4$ is hydrogen, methyl, ethyl, or any combination thereof, and m+n=an average value from 1–100. Since alkoxylation of the acetylenic alcohol affords a distribution of alkoxy groups, m+n typically is reported as an average value.

The alkoxylated acetylenic diol surfactants are useful in dye syntheses that are carried out in aqueous media and are effective in minimizing foaming and clumping during the reaction steps. Most desirably, the advantages of improved filtration effected through the use of alkoxylated acetylenic diols include decreased filtration time, increased solid content in filter cake, improved washing properties of filter cake, i.e., washability, and increased dye yield. For azo dyes that are synthesized as non-heat stable crystal modifications, the presence of alkoxylated acetylenic diol surfactants in the dye slurry during heat treatment is effective in promoting the conversion of dye to the desired thermally stable crystal modification.

DETAILED DESCRIPTION OF THE INVENTION

The disperse azo dye process is in most cases carried out in two steps, or stages. First, in the diazotization step, a diazotizable aromatic or heteroaromatic amine, in the presence of aqueous mineral acid, is converted into a solution or suspension of a diazonium salt in a mineral acid, for example by the action of nitrous acid produced in situ. In the second stage, the coupling, the aqueous solution or suspension of the diazonium salt is combined with an aqueous solution or suspension of the coupling component. In general, this is effected by running the solution or suspension of the diazonium salt in mineral acid into the aqueous solution or suspension of the coupling component. In most cases, the optimum pH in the particular case is maintained by adding bases, such as, for example, alkali metal hydroxides, alkali metal carbonates, ammonia, calcium carbonate, magnesium oxide and the like, or by adding buffer substances.

In the case of disperse dyestuffs, that is to say azo dyestuffs sparingly soluble in water, when the coupling is complete., a suspension of the dyestuff in water is obtained and the dyestuff is collected by filtration.

The process for preparing disperse azo dyes is generally taught at Col 5/19-6133 of U.S. Pat. No. 4,795,807. The diazo and coupling components that can be employed in the process include, but are not limited to, those outlined at Col 7/2-10/27 of U.S. '807. The cited texts of U.S. '807 are hereby incorporated by reference.

The alkoxylated acetylenic diol surfactants that may be used to advantage include those of the following formula:

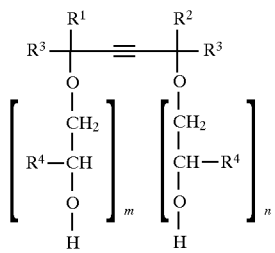

where $R^1$ and $R^2$ are C1–C8 alkyl, preferably, C4–C6 alkyl, $R^3$ is hydrogen or methyl, preferably methyl, $R^4$ is hydrogen, methyl, ethyl, or any combination thereof, preferably hydrogen, and the total of m+n is an average value from 1–100, inclusive, preferably 1–30, most preferably 1–10. Specifically, $R^1$ and $R^2$, which may be identical or different, include such alkyl groups as methyl, ethyl, propyl, isopropyl, butyl, isobutyl, sec-butyl, tert-butyl, pentyl, hexyl, ethylhexyl and octyl. Preferred surfactants are the acetylenic diols where $R^1$ and $R^2$ are isobutyl, $R^3$ is methyl, $R^4$ is hydrogen, and m+n=an average value of 1–30, especially 1–10.

The structure of the surfactant to be used with maximum effect depends on the specific disperse azo dye being prepared.

The alkoxylated acetylenic diol surfactants are effective as processing aids in the synthesis of disperse azo dyes in aqueous media and may be added to the disperse azo dye coupling bath prior to addition of diazonium salt, or may be added after coupling but prior to heat treatment of dye slurry. Although the surfactant may be added to the diazo salt composition, it is not preferred because of its high acidity. The amount of surfactant to be used is preferably from 0.1 to 10 wt % relative to dye solids in the dye synthesis, with surfactant amounts from 2 to 6 wt % relative to dye solids being particularly preferred. When the surfactants are added to the coupling bath prior to reaction, advantages in the filtration properties of product slurry are obtained with or without a heat treatment step. In addition, the surfactants provide benefit during the coupling reaction by minimizing foaming and clumping of dye precipitate.

For azo dyes that are synthesized as non-heat stable crystal modifications, the presence of alkoxylated acetylenic diol surfactants in the dye slurry during heat treatment is effective in promoting the conversion of dye to the desired thermally stable crystal modification. As a consequence, full conversion to thermally stable crystal modification is easier in the presence of the surfactants and requires less time and/or lower temperatures. During heat treatment, the surfactants also minimize the presence of foam, enable better stirring of the dye slurry, and provide a product slurry that is not clumpy and is easy to pour.

The beneficial use of alkoxylated acetylenic diol surfactants in azo dye synthesis does not require any change in the procedures normally used to isolate the dye as a press cake or filter cake. The benefits of decreased filtration time, increased solids content in filter cake, and improved washing properties of filter cake are obtained regardless of the temperature at which filtration is carried out. The surfactants do not decrease the amount of dye recovered; under some conditions, dependent primarily the dye solids level in the synthesis, an increase in dye yield is obtained when the surfactants are included in the coupling synthesis and/or heat treatment.

The use of alkoxylated acetylenic diols to improve the filtration properties of disperse azo dyestuffs will be exemplified through the synthesis of C. I. Disperse Yellow 3, which is the product of the coupling reaction between the diazonium salt of 4-aminoacetanilide and p-cresol.

EXAMPLE 1

This example demonstrates the synthesis and filtration of C.I. Disperse Yellow 3 without heat treatment.

To a 100 mL round bottom flask equipped with magnetic stir bar was added 3.75 g (0.025 mol) of 4-aminoacetanilide, 53 mL of $H_2O$, and 5.42 g (0.055 mol) of conc hydrochloric acid. Upon cooling to 0° C. in an ice bath, 1.75 g (0.025 mol) of $NaNO_2$ in 10 mL of $H_2O$ was added over the course of 10 min. The resulting brown solution of diazonium salt was stirred for 10–20 min at 0° C. Meanwhile, to a 500 mL glass kettle reactor equipped with overhead mechanical stirrer (teflon paddle) was added 2.75 g (0.0255 mol) of p-cresol, 175 mL of $H_2O$, 0.95 g (0.0238 mol) of NaOH, 5.25 g (0.0495 mol) of $Na_2CO_3$, and optionally, 0.34 g (5 wt % relative to theoretical mass yield of dye) of an ethoxylated acetylenic diol surfactant, namely an ethoxylate derived from 2,4,7,9-tetramethyl-5-decyne-4,7-diol, of the following formula:

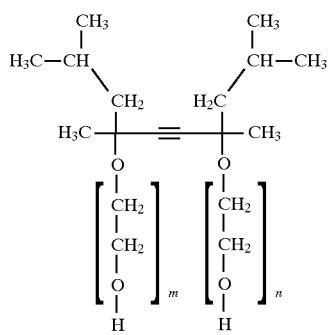

The resulting mixture was cooled to 0° C. in an ice bath. The pre-made diazonium salt solution was then delivered to this coupling bath over a period of 1.25 hr. Upon complete addition, the obtained slurry was stirred at 0° C. for an additional 3 hr, and was then allowed to warm to room temperature, with stirring, over 1 hr. On the basis of wide angle x-ray diffraction data, the product was identified as a crystal form of C.I. Disperse Yellow 3 that has been reported as β-modification in Nikol'skii, A. V.; et al, *J. Appl. Chem. USSR* (*Engl. Transl.*) 1986, 59, 1706. The slurry was then filtered via suction filtration using a 7 cm Buchner funnel fitted with Whatman® #1 qualitative paper. Once the flow of filtrate slowed to <1 drop/10 sec, the cake was successively washed with four 50 mL aliquots of deionized water. Filter cake dye solids were determined by measuring the change in mass upon drying ca. 3–5 g of dye sample.

Table 1 lists head-to-head comparisons for filtration and crystal properties of the dye product prepared without and with acetylenic diol surfactants of increasing levels of ethoxylation. While the non-ethoxylated acetylenic diol (m+n=0; Surfynol 104 surfactant) provided some improvement in filter cake solids versus dye prepared without surfactant, ethoxylated acetylenic diols effected superior results. Furthermore, ethoxylated acetylenic diols were effective in the dispersing of individual dye crystals, whereas agglomeration of crystalline product was observed for dye prepared without surfactant and with the non-ethoxylated Surfynol 104 acetylenic diol (m+n=0).

TABLE 1

Without Heat Treatment

| Acetylenic Diol Surfactant | Filter Cake Solids (wt %) | Qualitative Filtration Speed | Appearance Under Microscope (400x) |
|---|---|---|---|
| None | 6.5 | Quick | 50–200 μm diameter agglomerates of microcrystals and amorphous dye. |
| m + n = 0 | 15.5 | Slow | 50–200 μm diameter agglomerates of microcrystals. |
| m + n = 1.3 | 19.5 | Quick | 10–25 μm diameter dendritic crystals. |
| m + n = 9.5 | 25.1 | Quick | 25–50 μm diameter dendritic crystals. |

EXAMPLE 2

This example shows the synthesis and filtration of C.I. Disperse Yellow 3 at 2.6 wt % solids, with heat treatment.

Example 1 was repeated, except that prior to filtering the product, the dye slurry was subjected to heat treatment at 100° C. for 1 hour by placing the reaction kettle in a temperature-controlled oil bath. On the basis of wide angle x-ray diffraction data, the dye was converted upon heat treatment into a crystal form of C.I. Disperse Yellow 3 that has been reported as α-modification in the Nikol'skii, A. V.; et al article.

Filtration of the dye was carried out as described in Example 1. Filtration time was measured to be the time from pour until the flow of filtrate had slowed to a slow drip. "Adjusted Yield of Dye" was calculated as the mathematical product of mass yield and color purity. Color purity was measured by preparing acetone solutions of dye and comparing the 400 nm absorbency of these solutions to that of a solution of recrystallized C.I. Disperse Yellow 3. Table 2 lists head-to-head comparisons for the synthesis and filtration properties of the dye product prepared without and with acetylenic diol surfactants of increasing levels of ethoxylation. Superior results in terms of higher filter cake solids and faster filtration times were observed when using ethoxylated acetylenic diols as compared to non-ethoxylated acetylenic diol or no surfactant.

TABLE 2

2.6 wt % Solids with Heat Treatment

| Surfactant | Filter Cake Solids (wt %) | Filtration Time (seconds) | Adjusted Yield of Dye |
|---|---|---|---|
| none | 16.0 | 137 | 95.3 |
| m + n = 0 | 34.2 | 80 | 94.3 |
| m + n = 1.3 | 59.9 | 22 | 94.7 |
| m + n = 3.4 | 45.9 | 25 | 94.4 |
| m + n = 9.5 | 56.5 | 24 | 95.1 |

EXAMPLE 3

This example shows the synthesis and filtration of C.I. Disperse Yellow 3 at 9.8 wt % solids, with heat treatment.

To a 100 mL round bottom flask equipped with magnetic stir bar was added 11.26 g (0.075 mol) of 4-aminoacetanilide, 37 mL of $H_2O$, and 16.26 g (0.165 mol) of conc hydrochloric acid. Upon cooling to 0° C. in an ice bath, 5.18 g (0.075 mol) of $NaNO_2$ in 10 mL of $H_2O$ was added over the course of 10 min. The resulting brown solution of diazonium salt was stirred for 10–20 min at 0° C.

Meanwhile, to a 500 mL glass kettle reactor equipped with overhead mechanical stirrer (teflon paddle) was added 8.33 g (0.077 mol) of p-cresol, 112 mL of $H_2O$, 2.86 g (0.0714 mol) of NaOH, and 3.50 g (0.033 mol) of $Na_2CO_3$, and optionally, 1.01 g (5 wt % relative to theoretical mass yield of dye) of an acetylenic diol surfactant of the formula described in Example 1. The resulting mixture was cooled to 0° C. in an ice bath. The pre-made diazonium salt solution was then delivered to this coupling bath over a period of 1.25 hr. Upon complete addition, the obtained yellow slurry was stirred at 0° C. for an additional 2 hr. The slurry was allowed to warm to room temperature, with stirring, over 1 hr. The reaction kettle was then fitted with a condenser and was submersed in a pre-heated 100° C. oil bath for 1 hr. Upon completion of heat treatment, α-modification of C.I. Disperse Yellow 3 was isolated by filtration, as described in Examples 1 and 2.

Table 3 lists comparisons for the synthesis and filtration properties of the dye product prepared without and with acetylenic diol surfactants of increasing levels of ethoxylation. Superior results in terms of higher filter cake solids, faster filtration times, and increased adjusted yield were observed when using acetylenic diols compared to dye preparation without surfactant. Lower ethoxylates (m+n=1.3 and m+n=3.4) exhibited modest improvements in filter cake solids versus non-ethoxylated acetylenic diol; however, the filter cake washability was vastly improved over the non-ethoxylated diol as shown in Example 4.

TABLE 3

9.8 wt % Solids with Heat Treatment

| Surfactant | Filter Cake Solids (wt %) | Filtration Time (seconds) | Adjusted Yield of Dye |
|---|---|---|---|
| none | 26.1 | 300 | 87.9 |
| m + n = 0 | 58.1 | 60 | 93.9 |
| m + n = 1.3 | 63.9 | 60 | 93.4 |
| m + n = 3.4 | 61.1 | 60 | 93.9 |
| m + n = 9.5 | 41.7 | 40 | 94.6 |

EXAMPLE 4

This example demonstrates the washability of the C.I. Disperse Yellow 3 filter cakes. Sodium ion (Na+) content is a convenient measure of the ease with which a filter cake can be washed.

As a measure of filter cake washability, the dye products obtained as described in Example 3 were analyzed for Na$^+$ content. As indicated in the prior examples, each cake was successively washed with four 50 mL aliquots of deionized water. Na$^+$ content was determined with an ion-selective electrode on samples composed of 0.8 g of dried filter cake and 19.2 g of deionized water. Table 4 lists head-to-head comparisons for the Na$^+$ content of dye product prepared without and with acetylenic diol surfactants of increasing levels of ethoxylation. Dye prepared without added surfactant exhibited very poor washability and very high residual Na$^+$ content. The use of acetylenic diol surfactants in dye preparation vastly improved the washability of filter cakes, and lowered residual Na$^+$ by ca. 2–3 orders of magnitude. Ethoxylated acetylenic diols outperformed the non-ethoxylated diol by effecting ca. 4–20 times lower residual Na$^+$ content.

TABLE 4

| Surfactant | Na+ in Washed Filter Cake (ppm) |
|---|---|
| none | 25000 |
| m + n = 0 | 478 |
| m + n = 1.3 | 106 |
| m + n = 3.4 | 148 |
| m + n = 9.5 | 26 |

EXAMPLE 5

This example shows the improved conversion of crystal form upon heat treatment of C.I. Disperse Yellow 3 in the presence of acetylenic diols.

The extent of conversion from β-modification to stable α-modification crystal form of C.I. Disperse Yellow 3 was measured by differential scanning calorimetry for the samples described in Example 3. Dye prepared without added surfactant exhibited only ca. 80% conversion to α-modification after 1 hour heat treatment at 100° C., whereas dye prepared in the presence of acetylenic diol surfactants was fully converted to α-modification under the same heat treatment conditions.

STATEMENT OF INDUSTRIAL APPLICATION

The present invention improves the filtration properties of disperse azo dye slurries by performing the dye coupling reaction and/or heat treatment in the presence of alkoxylated acetylenic diols. The advantages effected through the use of alkoxylated acetylenic diols include decreased filtration time, increased solid content in filter cake, improved washing properties of filter cake, and increased dye yield. In addition, for disperse azo dyes that undergo a change in crystal form upon heat treatment, alkoxylated acetylenic diols lower the time requirements of heat treatment necessary to effect the desired change in crystal form.

I claim:

1. A process for the preparation of a disperse azo dye by reacting a diazonium salt of an aromatic or heteroaromatic amine with a coupling component in an aqueous media to afford an aqueous slurry of the azo dye and optionally heat treating the aqueous slurry, characterized by incorporating an alkoxylated acetylenic diol into the process.

2. The process of claim 1 in which the alkoxylated acetylenic diol is added to the coupling component.

3. The process of claim 1 in which the alkoxylated acetylenic diol is added to the aqueous azo dye slurry prior to the heat treating step.

4. The process of claim 1 in which the alkoxylated acetylenic alcohol is represented by the general formula:

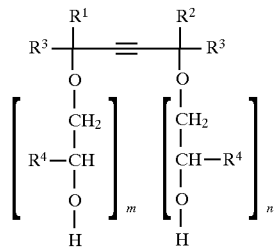

where $R^1$ and $R^2$, which may be the same or different, are C1–C8 alkyl, $R^3$ is hydrogen or methyl, $R^4$ is hydrogen, methyl, ethyl, or any combination thereof, and m+n is an average value from 1–100 and is incorporated at 0.1 to 10 wt % relative to dye solids.

5. The process of claim 4 in which $R^1$ and $R^2$ are C4–C6 alkyl, $R^3$ is methyl, $R^4$ is hydrogen and m+n is an average value of 1–30.

6. The process of claim 1 in which the alkoxylated acetylenic alcohol is an ethoxylate derived from 2,4,7,9-tetramethyl-5-decyne-4,7-diol.

7. The process of claim 6 in which m+n is an average value of 1–30.

8. In a process for the preparation of a disperse azo dye by reacting a diazonium salt of an aromatic or heteroaromatic amine with a coupling component in an aqueous media to afford an aqueous slurry of the azo dye and optionally heat treating the aqueous slurry, the improvement which comprises incorporating into the process prior to the heat treating step an alkoxylated acetylenic diol represented by the general formula:

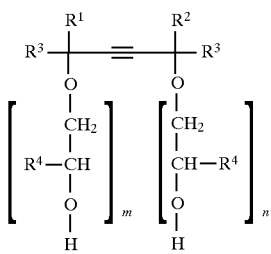

where $R^1$ and $R^2$, which may be the same or different, are C1–C8 alkyl, $R^3$ is hydrogen or methyl, $R^4$ is hydrogen or methyl, and m+n is an average value from 1–30, the alkoxylated acetylenic diol being incorporated at 0.1 to 10 wt % relative to dye solids.

9. The process of claim 8 in which the alkoxylated acetylenic diol is added to the coupling component.

10. The process of claim 8 in which the alkoxylated acetylenic diol is added to the aqueous azo dye slurry.

11. The process of claim 8 in which $R^1$ and $R^2$ are C4–C6 alkyl, $R^3$ is methyl, $R^4$ is hydrogen and m+n is an average value of 1–10.

12. The process of claim 11 in which the alkoxylated acetylenic diol is added to the coupling component.

13. The process of claim 11 in which the alkoxylated acetylenic diol is added to the aqueous azo dye slurry.

14. The process of claim 11 in which the alkoxylated acetylenic alcohol is an ethoxylate derived from 2,4,7,9-tetramethyl-5-decyne-4,7-diol.

15. The process of claim 14 in which the alkoxylated acetylenic diol is added to the coupling component.

16. The process of claim 14 in which the alkoxylated acetylenic diol is added to the aqueous azo dye slurry.

17. The process of claim 1 in which the azo dye is C.I. Disperse Yellow 3.

18. The process of claim 11 in which the alkoxylated acetylenic diol is incorporated at 2 to 6 wt % relative to dye solids.

19. The process of claim 12 in which the alkoxylated acetylenic diol is incorporated at 2 to 6 wt % relative to dye solids.

20. The process of claim 13 in which the alkoxylated acetylenic diol is incorporated at 2 to 6 wt % relative to dye solids.

* * * * *